(12) United States Patent
Kim

(10) Patent No.: US 6,828,899 B2
(45) Date of Patent: Dec. 7, 2004

(54) FINGERPRINT IDENTIFICATION SYSTEM AND METHOD FOR A MOTOR VEHICLE

(75) Inventor: Young-Kun Kim, Suwon (KR)

(73) Assignee: Cecrop Co., Ltd. (KR)

( * ) Notice: Subject to any disclaimer, the term of this patent is extended or adjusted under 35 U.S.C. 154(b) by 490 days.

(21) Appl. No.: 09/867,258

(22) Filed: May 29, 2001

(65) Prior Publication Data

US 2002/0048391 A1 Apr. 25, 2002

(30) Foreign Application Priority Data

Oct. 19, 2000 (KR) ........................................ 2000-61573

(51) Int. Cl.$^7$ .......................... G05B 19/00; G06F 7/00; G08B 29/00; H04B 1/00; B60R 25/00
(52) U.S. Cl. ..................... 340/5.53; 340/5.72; 340/5.83
(58) Field of Search ................. 340/5.53, 5.2, 340/10.6, 5.72, 5.82, 5.83, 10.42; 307/10.3, 10.5, 10.1, 10.2; 701/112, 113

(56) References Cited

U.S. PATENT DOCUMENTS

| | | | |
|---|---|---|---|
| 5,812,067 A | * | 9/1998 | Bergholz et al. ........... 340/5.52 |
| 6,078,265 A | * | 6/2000 | Bonder et al. ............. 340/5.23 |
| 6,100,811 A | * | 8/2000 | Hsu et al. .................. 340/5.83 |
| 6,140,939 A | * | 10/2000 | Flick ...................... 340/825.69 |
| 6,229,908 B1 | * | 5/2001 | Edmonds et al. ........... 382/124 |
| 6,271,745 B1 | * | 8/2001 | Anzai et al. ............... 340/5.53 |
| 6,351,703 B1 | * | 2/2002 | Avery, Jr. .................... 701/112 |
| 6,373,148 B1 | * | 4/2002 | Daiss et al. ................ 307/10.5 |
| 6,400,835 B1 | * | 6/2002 | Lemelson et al. .......... 382/118 |

FOREIGN PATENT DOCUMENTS

| | | |
|---|---|---|
| DE | 4344481 | 6/1995 |
| DE | 19707058 | 9/1998 |
| DE | 19917885 | 8/2000 |
| GB | 2349257 | 10/2000 |
| JP | 01-178049 | 7/1989 |
| JP | 02-279448 | 11/1990 |
| JP | 04-011544 | 1/1992 |
| JP | 05-023267 | 3/1993 |
| JP | 06-255449 | 9/1994 |
| JP | 09-048324 | 2/1997 |
| JP | 10-230818 | 9/1998 |
| JP | 2000-255382 | 9/2000 |

* cited by examiner

*Primary Examiner*—Michael Horabik
*Assistant Examiner*—Nam V Nguyen
(74) *Attorney, Agent, or Firm*—Cantor Colburn LLP

(57) ABSTRACT

A fingerprint identification system for a motor vehicle includes an ignition mode setting unit, a matching board and an engine control unit. The ignition mode setting unit identifies an ignition mode, scans and reads an input fingerprint, and sets and deletes a registered fingerprint. The matching board stores the registered fingerprint and compares the input fingerprint with the registered fingerprint to output an output signal. The engine control unit receives the output signal to output a control signal for controlling a key lock/release and a steering wheel lock/release.

10 Claims, 5 Drawing Sheets

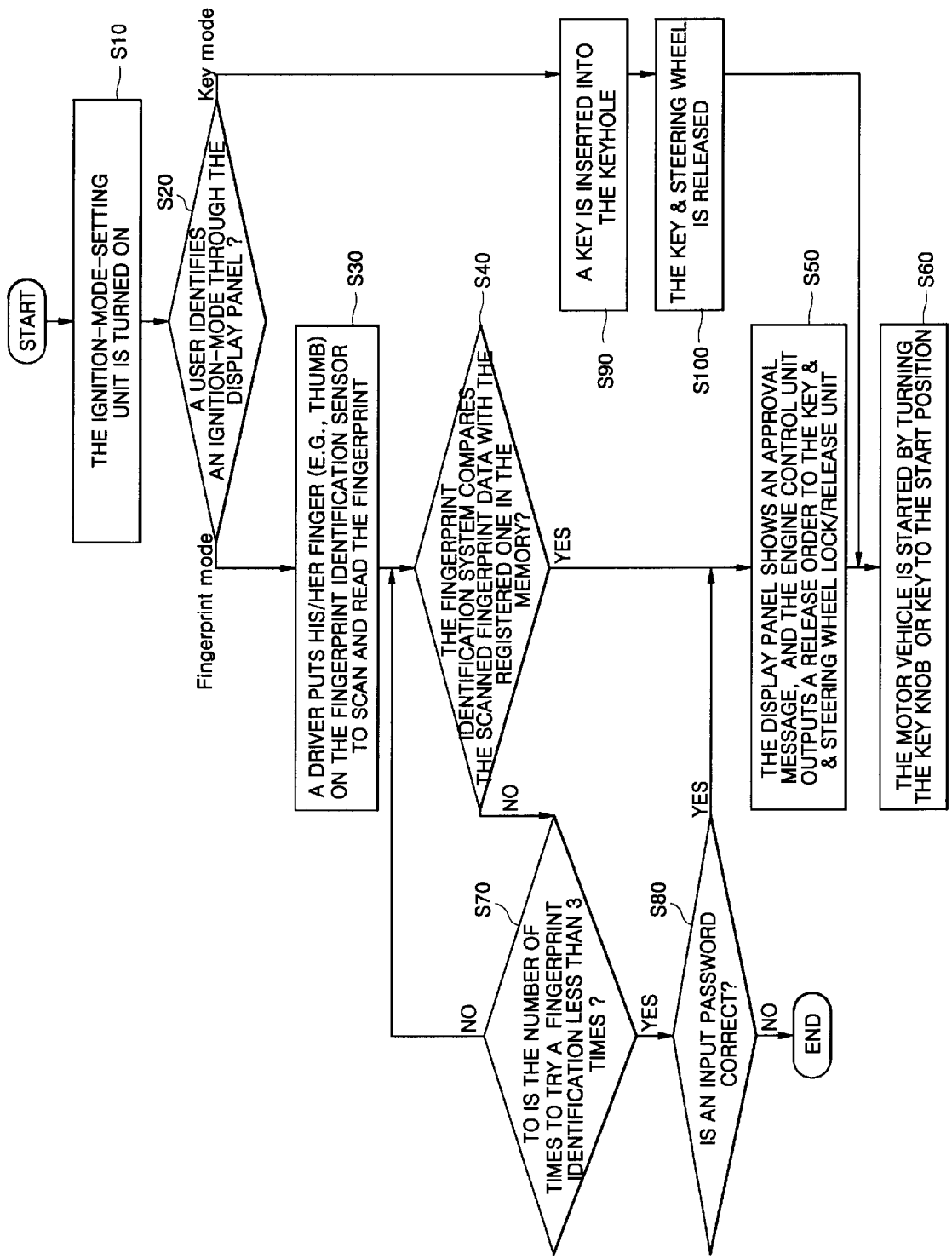

FINGERPRINT IDENTIFICATION SYSTEM AND METHOD FOR A MOTOR VEHICLE

BACKGROUND OF THE INVENTION

1. Field of the Invention

The present invention relates to a fingerprint identification system and method for a motor vehicle, and more particularly, to a fingerprint identification system and method for starting and operating a motor vehicle.

2. Description of Related Art

In general, the starting method of a motor vehicle is that, if he/she has a key for the motor vehicle, a driver inserts his/her key into a cylinder lock ignition switch of the vehicle and rotates the key for the cylinder lock ignition switch to go to Start-position, so that the motor vehicle is started. The cylinder lock ignition switch includes four positions: Lock-position; Accessories-position; On-position; and Start-position.

However, there is a problem that whoever has the key can start the vehicle, thereby leading to a risk of auto theft. In addition, there comes an inconvenience that the driver should always carry the key to start the motor vehicle.

SUMMARY OF THE INVENTION

To overcome the above described problems, preferred embodiments of the present invention provide a fingerprint identification system and method for a motor vehicle in which a driver can start a motor vehicle without his/her key.

It is another object to provide a fingerprint identification system and method for a motor vehicle that is safe from a risk of auto theft.

In order to achieve the above object, the preferred embodiments of the present invention provide a fingerprint identification system for a motor vehicle. The system includes an ignition mode setting unit, a matching board and an engine control unit. The ignition mode setting unit identifies an ignition mode, scans and reads an input fingerprint, and sets and deletes a registered fingerprint. The matching board stores the registered fingerprint and compares the input fingerprint with the registered fingerprint to output an output signal. The engine control unit receives the output signal to output a control signal for controlling a key lock/release and a steering wheel lock/release.

The ignition mode setting unit includes a power button to turn on the ignition mode setting mode; a fingerprint identification sensor for scanning and reading the input fingerprint; a figerprint mode setting button for setting the ignition mode to a fingerprint mode; a key mode setting button for setting the ignition mode to a key mode; a fingerprint registeration button for setting the registered fingerprint; and a fingerprint deleting button for deleting the registered fingerprint.

The ignition mode setting unit further includes a password input for inputting an input password in the matching board and setting a registered password, and the matching board further compares the input password with the registered password.

The system further includes a display panel for providing a display window. The system further includes a key & steering wheel lock/release unit for locking and releasing the key and the steering wheel according to the control signal from the engine control unit. The system further includes an immobilizer for outputting a command for fuel distribution to an engine of the motor vehicle in response to the control signal from the engine control unit. The system further includes an cylinder lock ignition switch including a Lock-position, an Accessories-position, an On-position, and a Start-position, a key knob, and a keyhole, the key knob movable to any of the four positions, the keyhole accepting a key.

The motor vehicle is started by the key only when the ignition mode is set to the key mode.

The preferred embodiment of the present invention further provides a method of starting a motor vehicle. The method includes turning on an ignition mode setting unit; identifying an ignition mode, the ignition mode including a fingerprint mode and a key mode; scanning and reading an input fingerprint by a user when the ignition mode is set to the fingerprint mode; comparing the input fingerprint with a registered fingerprint; and releasing a key and a streeing wheel when the input fingerprint is consistent with the registered fingerprint to start the motor vehicle.

The method further includes displaying an approval messsange through a display panel when the input fingerprint is consistent with the registered fingerprint to start the motor vehicle. The method further includes setting the ignition mode to either of the key mode and the fingerprint mode after the approval message is displayed. The method further includes inputting an input password and comparing the input password with a registered password when the input fingerprint is nto consistent with the registered fingerprint.

According to the method of starting and operating a motor vehicle, a user can start his/her motor vehicle without a key under the fingerprint-mode. In addition, a user can prevent his/her motor vehicle from auto theft by inhibiting the other person's starting the vehicle.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which:

FIG. 4 is a flow chart illustrating a method of starting a motor vehicle according to the preferred embodiment of the present invention.

DETAILED DESCRIPTION OF PREFERRED EMBODIMENTS

Figure 1:
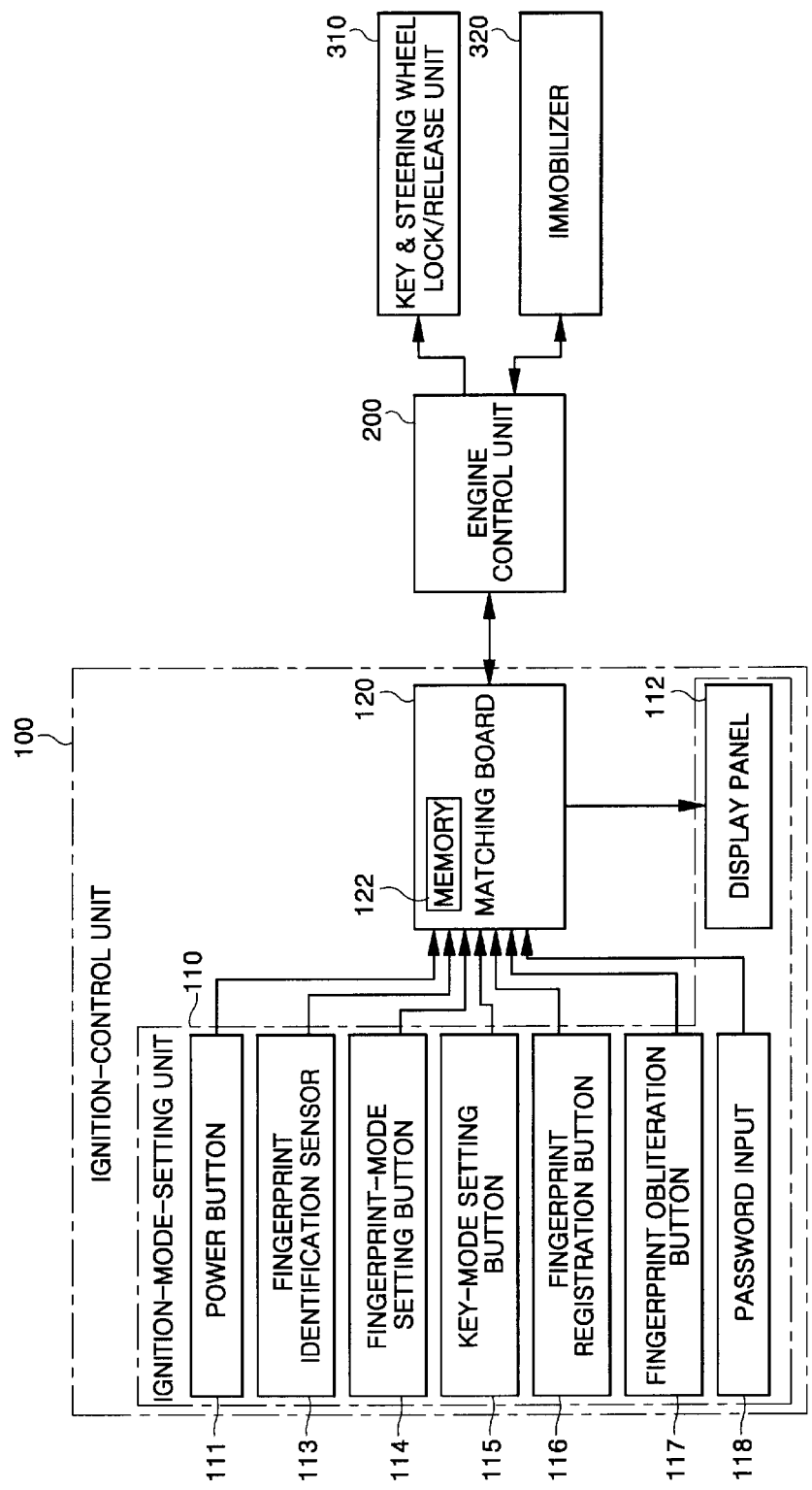
FIG. 1 is a block diagram illustrating a fingerprint identification system for a motor vehicle according to a preferred embodiment of the present invention.

Reference will now be made in detail to preferred embodiments of the present invention, example of which is illustrated in the accompanying drawings.

Returning now to FIG. 1, a fingerprint identification system for a motor vehicle includes an ignition-control unit 100, an engine control unit 200, a key & steering wheel lock/release unit 310, and an immobilizer 320.

The ignition-control unit 100 includes an ignition-mode-setting unit 110 and a matching board 120. The ignition-mode-setting unit 110 includes a power button 111, a display panel 112, a fingerprint identification sensor 113, a fingerprint-mode setting button 114, a key-mode setting button 115, a fingerprint registration button 116, a fingerprint obliteration button 117, and a password input 118.

Figure 2:
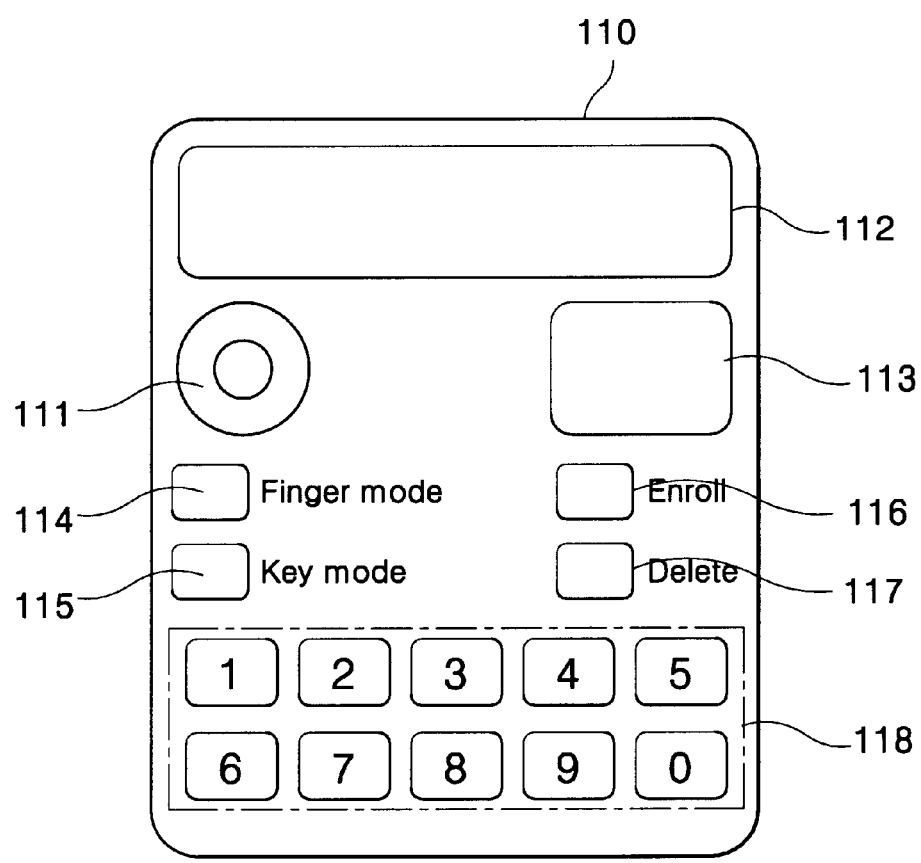
FIG. 2 shows a configuration of an ignition-mode-setting unit of FIG. 1, according to the preferred embodiment of the present invention.

FIG. 2 shows a configuration of the ignition-mode-setting unit of FIG. 1. The power button 111 is used to push on or off the power to the ignition-mode-setting unit 110. The display panel 112 displays an indication such as a fingerprint-mode or a key-mode. The fingerprint identification sensor 113 scans and reads a driver's fingerprint. The fingerprint-mode-setting button 114 is used to set an ignition mode to the fingerprint-mode. The key-mode-setting button 115 is used to set an ignition mode to the key-mode. The fingerprint registration button 116 is used to enroll a scanned fingerprint in a memory 122 of the matching board 120. The fingerprint obliteration button 117 is used to delete fingerprint data stored in the memory 122. The password input 118 is used to store or delete a password, to change a recorded password and to assign, for example, an ID number or a name corresponding to the recorded fingerprint. In other words, as shown in FIG. 2, the password input 118 may includes digit button that are used to input a digit or/and character buttons that are used to input a Korean character data or a English character data. Otherwise, the password input 118 may be configured as a direction button that can input a digit or a character by pushing direction keys.

The matching board 120 discriminates whether an input password by a driver correlates to a pre-set password stored in the memory 122, and whether pre-recorded fingerprint data stored in the memory correlates to scanned fingerprint data by the ignition-mode-setting unit 110. The matching board 120 also serves to provide an interface between the ignition mode setting unit 110 and the engine control unit 200. The memory 122 of the matching board 120 stores a fingerprint data, for example, minutia patterns, for the matching board 110 to compare a stored fingerprint data with an input fingerprint data. Registered fingerprints are associated with, for example, the ID number or a character.

The engine control unit (ECU) 200 receives and converts ignition signals from the matching board 110 of the ignition-control unit 100 to input signals to output control signals to ignition-related components (e.g., the key & steering lock/release unit 310 and the immobilizer 320).

The key & steering wheel lock/release unit 310 locks and releases both a key and a steering wheel according to the control signals from the engine control unit 200.

Figure 3A:
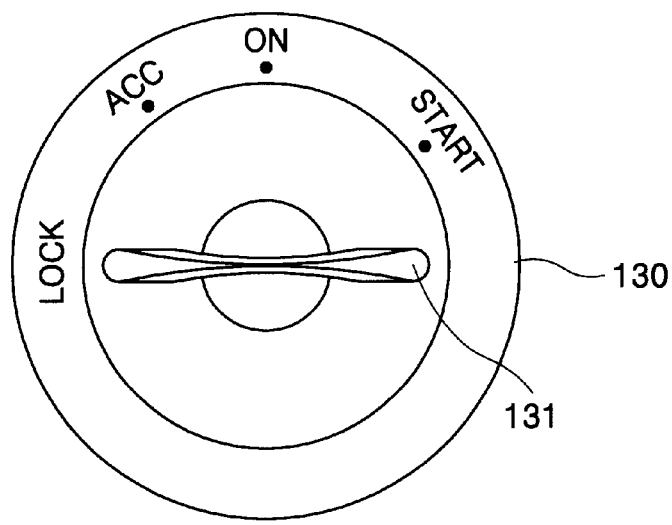
FIG. 3A is a top view illustrating a cylinder lock ignition switch of the fingerprint identification system for a motor vehicle according to the preferred embodiment of the present invention.
Figure 3B:
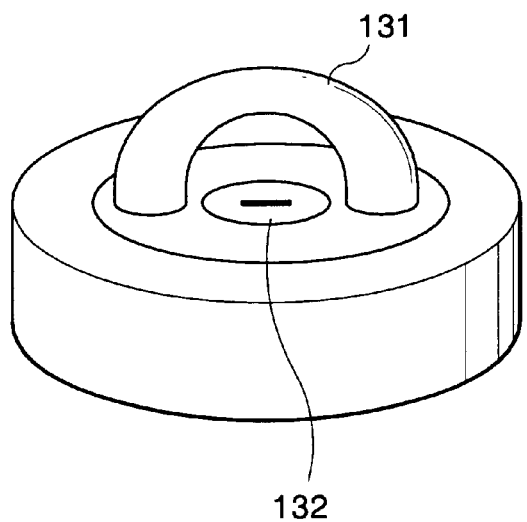
FIG. 3B is a perspective view illustrating a cylinder lock ignition switch of the fingerprint identification system for a motor vehicle according to the preferred embodiment of the present invention.

The immobilizer 320 outputs a command for fuel distribution to an engine of the motor vehicle in response to a control signal from the engine control unit 200 or when the key is inserted into a keyhole 132 (see FIG. 3B). For example, when either of a password and a fingerprint is verified as correct data, a lock operation or a release operation is performed.

FIGS. 3A and 3B show a configuration of a cylindrical lock ignition switch of the fingerprint identification system according to the preferred embodiment of the present invention. As shown in FIGS. 3A and 3B, the cylinder lock ignition switch 130 include a key knob 131 and the keyhole 132. The key-knob is configured to go to any of Lock-position, Accessories-position, On-position, and Start-position. A key of a motor vehicle is inserted into the keyhole 132. In this case, in order to start a motor vehicle, the key inserted into the keyhole 132 has to move to Start-position. The key may be inserted into the keyhole 132 through various method. For example, the key knob 131 may include a through hole (not shown) through which the key passes. Or, the key knob 131 may be configured to be laid aside for the key to directly insert into the keyhole 132.

According to the preferred embodiment of the present invention, a motor vehicle is started by one of the following three methods: a fingerprint; a password; and a key. Of these, the method using a key can be used only in the state that an ignition mode is set to the key mode. It is possible to set an ignition mode to the key mode only after an approval message by a fingerprint identification or a password input. That is, in order to change an ignition mode from the fingerprint mode to the key mode or from the key mode to the fingerprint mode, a fingerprint identification or a password input is required. A method of changing the ignition mode will be explained in detail with reference to FIG. 5.

The method of starting a motor vehicle according to the preferred embodiment of the present invention is explained in detail with reference to FIG. 4. First, when a driver takes on his/her vehicle after opening the door, s/he pushes on the power button 111 to turn on the ignition-mode-setting unit 110 (step 10), whereupon a display panel 112 is operated. In order to turn on the ignition mode setting unit 110, it is also possible to enable the power button 111 to be automatically pushed on when a user opens the door. Thereafter, a user identifies which of the key mode and the fingerprint mode is set to the ignition-mode through the display panel 112 (step 20).

If the ignition mode is set to the key mode, a user can start the motor vehicle using the key. That is, the user inserts the key into the keyhole 132 (step 90), so that the key & steering wheel is released. The user turns the key to the start position to start the motor vehicle (step 60).

However, if the ignition mode is set to the fingerprint mode, the user puts his/her finger (e.g., thumb) on the fingerprint identification sensor 113 to scan and read his/her fingerprint (step 30). The matching board 120 compares the scanned fingerprint data from the fingerprint identification sensor 113 with the registered one in the memory 122 (step 40). When the two fingerprint data are identified, the display panel 112 shows an approval message, and the engine control unit 200 outputs a release order to the key & steering wheel lock/release unit 310 (step 50). As a result, the motor vehicle can be started by turning the key knob 131 to the Start position (step 60).

In the step 40, in case that the scanned fingerprint does not correlate to the recorded one in the memory 122, a user can continue to try a fingerprint identification up to, preferably, less than three times (step 70). When the scanned fingerprint correlates to the recorded one in the memory 122 within, preferably, three times, an operation of the step 50 is performed. In case that the present scanned fingerprint is not equal to the recorded one in the memory 122 even in excess of three times, in order to start the motor vehicle, a user has to input a password through the password-input unit 118. When a user input password is correct (step 80), the display panel 112 shows an approval message, and a release order is outputted to the key & steering wheel lock/release unit 310 (step 50). As a result, the motor vehicle is started by turning the key knob 131 to the Start position (step 60). At this point, the number of times to input a password is not limited to the present invention. For example, the number of times to input a password is preferably within three times. However, a user input password is not consistent with a stored password in the memory 122, an operation of the fingerprint identification system for a motor vehicle may be finished.

In the mean while, when the display panel 112 shows an approval message after a fingerprint identification or a correct password input, the user can change the ignition mode from the key mode to the fingerprint mode or from the fingerprint mode to the key mode.

Regardless of the set ignition mode (i.e., the key mode and the fingerprint mode), when the user inputs a correct password to receive an approval message from the display panel 112, the motor vehicle becomes a state capable of being started. That is, the user can turn the key knob 131 to Start position to start the motor vehicle.

Figure 5:
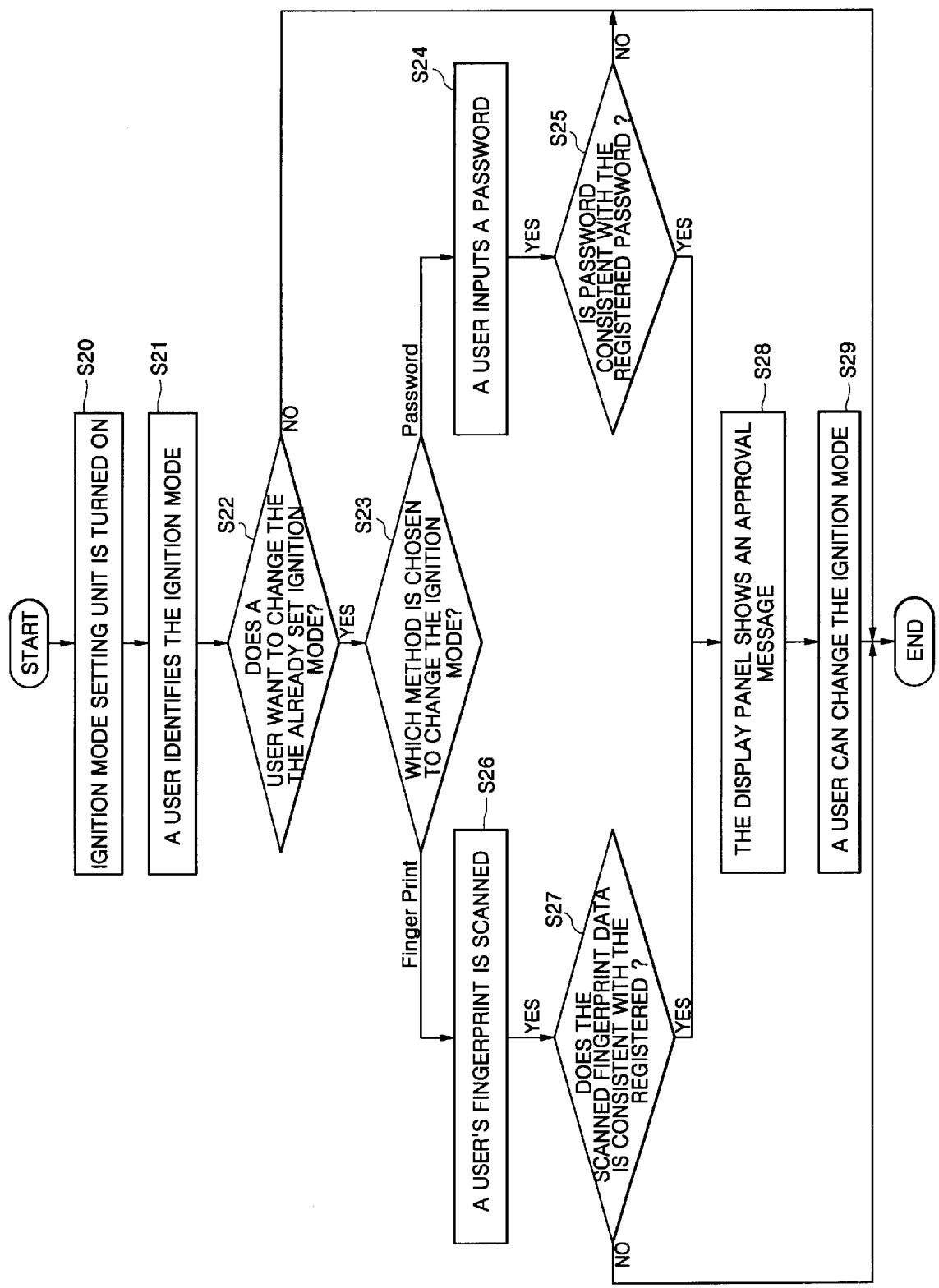
FIG. 5 is a flow chart illustrating a method of changing an ignition mode according to the preferred embodiment of the present invention.

FIG. 5 is a flow chart illustrating a method of changing the ignition mode according to the preferred embodiment of the present invention. When the ignition mode setting unit is turned on (step 20), a user identifies which of the key mode and the fingerprint mode is set to the ignition mode (step 21). When a user wants to change the already set ignition mode (step 22), a user has to choose an ignition mode changing method (step 23). There are two methods to change the ignition mode: password input; and fingerprint identification.

When a user wants to change the ignition mode using a password, a user inputs a password (step 24). In the same described above, it is discriminated whether the input password is consistent with the registered password (step 25). When the input password is correct, the display panel shows an approval message (step 28), whereby a user can change the ignition mode from the key mode to the fingerprint mode or from the key mode to the fingerprint mode (step 29).

In the other hands, when a user wants to change the ignition mode using the fingerprint identification, a user puts his/her finger on the fingerprint identification sensor to scan and read the fingerprint (step 26). The matching board compares the scanned fingerprint data with the registered one in the memory (step 27). When the scanned fingerprint data is consistent with the registered one, the display panel shows an approval message (step 28), whereby a user can change the ignition mode from the key mode to the fingerprint mode or from the key mode to the fingerprint mode (step 29).

At this point, as described above, the number of times to input a password or to scan a finger is not limited to the present invention.

As described herein before, according to the method of starting and operating a motor vehicle, a user can start his/her motor vehicle without a key under the fingerprint-mode. In addition, a user can prevent his/her motor vehicle from auto theft by inhibiting the other person's starting the vehicle.

While the invention has been particularly shown and described with reference to preferred embodiments thereof, it will be understood by those skilled in the art that the foregoing and other changes in form and details may be made therein without departing from the spirit and scope of the invention. For example, an integrated memory system (IMS) for a motor vehicle may be applied to the inventive fingerprint identification system for a motor vehicle. That is, information such as a mirror angle and a seat height are stored according to different users, and thereafter when a fingerprint of the registered user is identified, the information such as a mirror angel and a seat height may be used to make a condition of the motor vehicle be suitable for the user.

What is claimed is:

1. A fingerprint identification system for a motor vehicle, comprising:
   an ignition control unit, including:
      an ignition mode setting unit for setting an ignition mode as a key mode or a fingerprint mode, setting a password for converting the ignition mode, scanning and reading an input fingerprint, and setting and deleting a registered fingerprint;
      a matching board for comparing the input fingerprint or the password with a registered fingerprint or a registered password to output an output signal; and
      an engine control unit for receiving the output signal to output a control signal for controlling a key lock/release and a steering wheel lock/release, wherein the ignition mode is converted from the key mode into the fingerprint mode when the input password matches with the registered password, thereby igniting a motor vehicle without the key.

2. The system of claim 1, wherein the ignition mode setting unit includes:
   a power button to turn on the ignition mode;
   a display panel for displaying the ignition mode;
   a fingerprint identification sensor for scanning and reading the input fingerprint;
   a fingerprint mode setting button for setting the ignition mode to the fingerprint mode;
   a key mode setting button for setting the ignition mode to the key mode;
   a fingerprint registration button for setting the registered fingerprint;
   a fingerprint deleting button for deleting the registered fingerprint; and
   a password input for inputting the password in the matching board and for setting the registered password.

3. The system of claim 1, further comprising, a key and steering wheel lock/release unit for locking and releasing the key and the steering wheel according to the control signal from the engine control unit.

4. The system of claim 1, further comprising, an immobilizer for outputting a command for fuel distribution to an engine of the motor vehicle in response to the control signal from the engine control unit.

5. The system of claim 1, further comprising, an cylinder lock ignition switch including a Lock-position, an Accessories-position, an On-position, and a Start-position, a key knob, and a keyhole, the key knob movable to any of the four positions, the keyhole accepting the key.

6. The system of claim 1, wherein the motor vehicle is started by the key only when the ignition mode is set to the key mode; and
   wherein the motor vehicle is started by the fingerprint mode when the ignition mode is set to the fingerprint mode by a driver.

7. A method of starting a motor vehicle, comprising:
   identifying an ignition mode, the ignition mode including a fingerprint mode and a key mode;
   igniting a motor vehicle using a key when the ignition mode is set to the key mode;
   scanning and reading an input fingerprint by a user when the ignition mode is set to the fingerprint mode;
   comparing the input fingerprint with a registered fingerprint; and
   igniting the motor vehicle without the key after releasing a key and a steering wheel unit of the motor vehicle when the input fingerprint is consistent with the registered fingerprint, wherein the method further comprises changing the ignition mode from the key mode to the fingerprint mode using a password, including:

inputting an input password;

comparing the input password with a registered password; and changing the ignition mode from the key mode to the fingerprint mode when the input password is consistent with the registered password.

8. The method of claim 7, wherein the motor vehicle is started by the key only when the ignition mode is set to the key mode; and wherein the motor vehicle is started by the fingerprint mode when the ignition mode is set to the fingerprint mode by a driver.

9. The method of claim 7, further comprising:

changing the ignition mode from the key mode to the fingerprint mode using a fingerprint identification, including:

turning on an ignition mode setting unit;

scanning and reading an input fingerprint by a user;

comparing the input fingerprint with the registered fingerprint; and changing the ignition mode front the key mode to the fingerprint mode when the input fingerprint is consistent with the registered fingerprint.

10. The method of claim 9, wherein changing the ignition mode further includes:

inputting an input password when the input fingerprint does not match with the registered fingerprint;

comparing the input password with a registered password; and changing the ignition mode from the key mode to fingerprint mode when the input password matches with the registered password.

* * * * *